United States Patent [19]
Jones

[11] 3,901,854
[45] Aug. 26, 1975

[54] TWO STAGE PROCESS FOR PREPARING AROMATIC POLYAMIDES

[75] Inventor: Rufus S. Jones, Dover, N.J.

[73] Assignee: Celanese Corporation, NY, N.Y.

[22] Filed: May 14, 1973

[21] Appl. No.: 359,924

Related U.S. Application Data

[63] Continuation-in-part of Ser. No. 206,491, Dec. 9, 1971, Pat. No. 3,753,957.

[52] U.S. Cl. ........ 260/78 R; 260/47 CZ; 260/63 N; 260/65
[51] Int. Cl. ............................................. C08g 20/20
[58] Field of Search................ 260/78 R, 65, 47 CZ

[56] References Cited
UNITED STATES PATENTS

| | | | |
|---|---|---|---|
| 3,329,653 | 7/1967 | Bearers et al. | 260/78 R |
| 3,379,695 | 4/1968 | Wolfes et al. | 260/78 R |
| 3,723,396 | 3/1973 | Jones et al. | 260/78 R |

*Primary Examiner*—Harold D. Anderson

[57] ABSTRACT

High molecular weight aromatic linear polyamides of fiber-forming grade are prepared by condensation of monomeric aromatic phenyl esters of aromatic dicarboxylic acids and an aromatic diamine in about a 1 to 1 molar ratio. The condensation product is further polymerized, preferably in the solid state, to produce high viscosity linear aromatic polyamides. The described process is particularly advantageous economically because of the high yield of fiber, film and coating grade polymer coupled with the ability to recover the by-product for recycle to form the monomeric aromatic ester starting material.

12 Claims, No Drawings

TWO STAGE PROCESS FOR PREPARING AROMATIC POLYAMIDES

INTRODUCTION

This is a continuation in part of Ser. No. 206,491 filed Dec. 9, 1971, now U.S. Pat. No. 3,753,957.

This invention relates to the production of aromatic polyamides and more particularly, to the production of high molecular weight, linear fiber-forming aromatic polyamides particularly polymers which are the condensation product of isophthalic acid, terephthalic acid and meta and paraphenylene diamines more particularly described as polyparaphenylene terephthalamide, polymetaphenylene terephthalamide, polyparaphenylene isophthalamide, polymetaphenylene isophthalamide, analogs and copolymers thereof.

BACKGROUND OF THE INVENTION

In recent years, considerable interest has been generated in wholly aromatic polyamides. A number of methods have been described for preparing such polymers, but in general such methods have been undesirable in one or more respects, such as in the difficulty of preparing the monomers, the production of undesirable by-products, some of which may act as polymerization inhibitors and the like. Of the various methods known for producing such polymers, such methods generally have serious shortcomings and are undesirable either because of their relatively low yields, the multi-step reactions involved, or the relatively high cost of reactants and/or monomeric starting materials. Such difficulties are substantially overcome by the present invention, wherein the major by-product of the reaction is readily removed and recovered and can be recycled to form the beginning ester starting material, thereby substantially improving economics as well as ease of preparation of the polymer.

THE INVENTION

In accordance with the invention, a method is provided for preparing high molecular weight wholly aromatic polyamides, comprising heating at an elevated temperature in about a mole to mole ratio, a monomeric diester compound corresponding to the formula

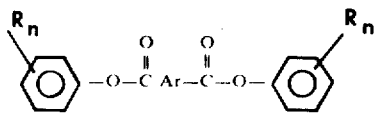

and a diamine of the formula H$_2$N—ArNH$_2$ wherein Ar is selected from the group consisting of meta and para

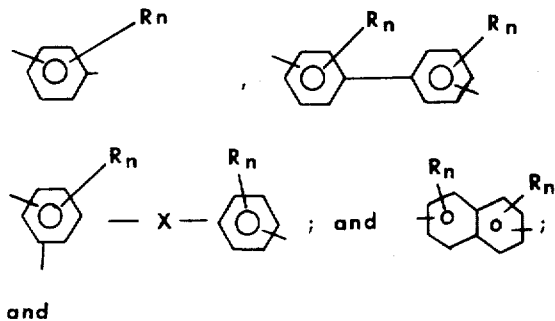

and mixtures thereof, wherein R is any monofunctional substituent inert under the reaction conditions, n is an integer of 0 to 4, X is —O—,

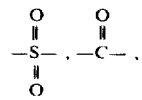

cycloalkylidene of up to 8 carbon atoms, or CY$_2$ wherein C is carbon and Y is hydrogen, mononuclear aryl or alkyl of 1 to 6 carbon atoms, said heating being in the absence of oxygen and at a temperature sufficient to effect reaction but below an explosive reaction rate to form an oligomer, subsequently increasing said temperature to a range of from about 300°C to just below the polyamide decomposition temperature, thereby volatilizing monomeric by-products and continuing said heating for a time sufficient to form a product having an inherent viscosity of at least 0.4 as measured using a solution of 0.4 grams of product per 100 milliliters of concentrated aqueous sulfuric acid (97–99% by weight) at 25°C. R is most preferably hydrogen, short chain aliphatic or alkoxy of 1 to 6 carbon atoms, halogen or phenyl.

DETAILS OF THE INVENTION

In the most preferred embodiment of the invention, the monomeric materials being condensed first to the oligomer and subsequently polymerized to the high polymer, are diphenylterephthalate, diphenylisophthalate and mixtures thereof. While the noted monomers are the most desirable reactants to form film and fiber-forming polymers with certain preferred properties, variations in such properties as well as entirely different properties can be realized by using other monomeric starting compounds such as the following, all of which are within the present invention:

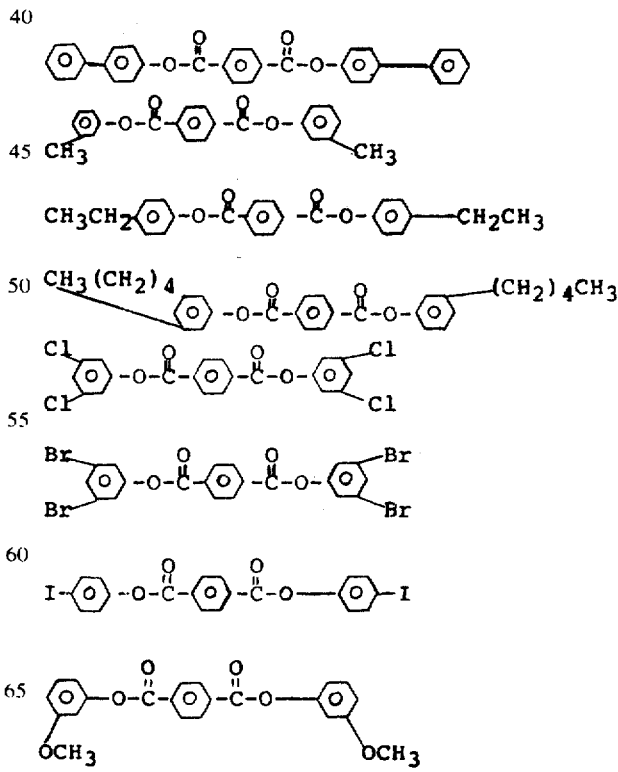

The diamine reacted with the monomeric diester is preferably meta or para phenylenediamine. Alternatively or additionally other aromatic diamines such as the following can be used.

The monomeric diester and aromatic diamine are preferably reacted in a mole to mole ratio. Such reaction ratio, however, can be varied to utilize up to about a 2 mole percent excess of one reactant depending on the particular properties desired in the resulting polymer. For instance, it is sometimes considered desirable to have a low proportion of carboxylic end groups. A slight excess of diamine will aid in this result. For other uses, a low ratio of amine end groups may be desired and, thus, a corresponding small molar excess of monomeric ester is used. Large excesses of one reactant, unless compensated for in the reaction, tend to limit the molecular weight of the resulting polymer and, thus, may not provide the more desirable film and fiber-forming viscosities.

In reacting the monomeric diester starting material with the aromatic diamine, the first stage reaction is a condensation reaction involving the splitting off of phenol at the ester linkage coupled with the amidification of the ester group by reaction with an amino group of the diamine thereby forming an amide oligomer. The phenol material is readily separated from the reaction mixture by volatilization.

The monomeric diester starting materials can be conveniently prepared from the corresponding aromatic dicarboxylic acid, i.e. terephthalic acid. The carboxylic acid is esterified with phenol under known esterification procedures such as reacting the acid chloride with the phenol in the presence of an acid acceptor such as pyridine.

The phenol reacted with the aromatic acid is preferably an unsubstituted phenol, but where desired, such as in the availability of an inexpensive phenol, substituted phenols as disclosed herein can be used wherein the substituents are non-reactive under the esterification and poly-condensation reactions. Such substituents include phenyl, lower alkyl of 1 to 6 carbon atoms and halogen, i.e. chloro, fluoro, bromo and iodo. Typical phenols include phenol, hydroxybiphenyl, o-chlorophenol, m-bromophenol, p-fluorophenol, o,p-dichlorophenol, o,m,p-tribromophenol, o-methylphenol, p-ethylphenol, o,p-dimethylphenol, o,m,p-trimethylphenol, b-butyphenol, m-hexylphenol.

The aromatic diamines are conveniently prepared by reduction of corresponding nitro compounds. The nitro substituted aromatic is readily reduced by reacting with hydrogen preferably under superatmospheric pressure utilizing a hydrogenation catalyst such as palladium or platinum, temperatures in the range of 50° to 70° centigrade and pressures of about 3 atmospheres. Any of the various hydrogenation processes as generally known in the art can be utilized to effect reduction. The hydrogenation reaction is preferably carried out in a solvent for the monomer such as a short chain, low boiling esters or alcohols which can be readily separated after hydrogenation by volatilization. Typically, ethyl acetate is a convenient solvent for this purpose.

It is often most desirable to begin with a fairly pure isomer or a specific purified mixture of isomers so as to ultimately form a pure polymer having the desired properties because impurities normally detract from such properties. While it is thus desirable to begin with monomers of high purity, the reaction products can be conveniently purified after phenol esterification or reduction of the nitro group prior to condensation. The temperature and solubility differentials between the isomers is often improved thereby permitting easy purification at a later stage at which time any additionally generated impurities can also be removed.

The monomeric diester and diamine are preferably recrystallized to improve the purity of these starting materials. Improved purity is directly reflected in the resulting ultimate properties of fibers or films produced from the monomers.

The reaction is preferably performed in the presence of a liquid diluent which also acts as a solvent for the monomers and/or a heat transfer agent. The diluent is, of course, chosen for its properties of inertness under the reaction conditions, boiling point, solubilizing properties of monomer reactants and polymer, specific heat properties and the like. Diluents which boil at temperatures below the reaction temperatures can be used provided superatmospheric pressures are imposed. Diluents which are only solvents for the monomer provide easy separation of the polymer therefrom as the polymer is precipitated from the solution. On the other hand, diluents which are solvents for the polymer can often times be additionally used for the direct spinning or casting of the polymer on completion of the polymerization. Advantages and disadvantages can be found for each type of diluent.

Typical of diluents which also act as solvents for the polymer include but are not limited to amides and ureas such as N,N-dimethylacetamide, N,N-dimethylpropionamide, N,N-dimethylbutyramide, N,N-dimethylisobutyramide, N,N-dimethylmethoxyacetamide, N,N-diethylacetamide, N-methylpyrrolidone-2, N-methylpiperidone-2, N-methylcaprolactam, N-ethylpyrrolidone-2, N-acetylpyrrolidone, N-acetylpiperidine, N,N'-dimethylethyleneurea, N,N'-dimethylpropyleneurea, hexamethylphosphoramide, N,N,N',N'-tetramethylurea and the like.

Diluents which do not act as a solvent for the polymer and which are desirably used herein include but are not limited to aromatic hydrocarbons such as toluene, xylene, polymethylbenzenes, ethylbenzene, the polyethylbenzenes, cumene, naphthalene, the methyl naphthalenes such as alphamethyl naphthalene and beta methyl naphthalene, acenaphthene, polymethylnaphthalenes, biphenyl, diphenylmethane, aliphatic and cycloaliphatic hydrocarbons such as cosane, heptadecane, tetrahydronaphthalene, decahydronaphthalene, relatively high boiling petroleum hydrocarbon fractions such as kerosenes and gas oils, ethers such as diphenyl ether and ditolyl ether, and aryl sulfones, including diaryl sulfones and aryl sulfones which may contain substituents of aryl, alkyl and alkoxy of one to six carbon atoms.

The diluent can be used in an amount ranging from about 50 to 1500 percent based on the weight of polymer. The higher proportions of this range are preferably used with diluents which act as solvents for the polymer such that workable viscosities are obtained. The lower portion of this range, i.e. 50 to about 300 percent, is preferably used with the nonsolvent diluents and/or under conditions where the diluent is removed from the reaction prior to the completion of the polymerization stage. Such removal can be accomplished by filtering, evaporating, steam stripping and the like.

As has been pointed out, the diluent can be retained with the reactants through the completion of the polymerization. Alternatively, the diluent can be removed after the condensation of the monomers to an oligomer stage. If the diluent is removed prior to completion of the polymerization, the polymerization reaction is continued under solid state conditions until the desired polymer weight is obtained. It is to be noted, however, that many of the diluents useful herewith perform the valuable additional function of a heat transfer agent in further solid state polymerizations.

The condensation reaction of the monomeric phenyl ester with the aromatic diamine proceeds rapidly under the influence of heat, such as by heating to at least 100° centigrade. No catalyst is required although such could be used if desired. At temperatures above about 345°C, the reaction proceeds violently, and therefore it is desirable to limit the first stage of the polymerization to temperatures not greatly exceeding about 345°C. Such temperatures are best selected depending upon the reaction mass size and the ability to control the reaction. Heating is continued at such temperatures until a solid oligomer is formed. Alternatively, the reaction can be continued until the oligomer has an intrinsic viscosity about 0.1 to about 0.4, as measured in a solution of 0.4 grams oligomer per 100 milliliters of concentrated sulfuric acid at 25°C.

Inherent viscosities ($\eta$ inh) are determined in accordance with the following equations:

$$\eta inh = \frac{\ln \eta\, rel}{C}$$

the relative viscosity ($\eta$rel) is determined by dividing the flow time in a capillary viscometer of a dilute solution of the polymer by the flow time for the pure solvent. The concentration (C) is 0.4 gram of polymer per 100 cc of concentrated (97 to 99%) $H_2SO_4$.

The polymerization reaction is preferably carried out under a blanket of inert gas, such as nitrogen, neon, argon, krypton, and the like to thereby reduce oxidation products and degradation of the polymer. The polymerization process is conveniently carried out under atmospheric pressure. However, super and subatmospheric pressures can be utilized if desired. Subatmospheric conditions can be conveniently utilized primarily after the formation of the oligomer such as to aid in the removal of the volatile by-products and diluent from the reaction mixture. When superatmospheric pressure is utilized, such as when the diluent boils below the reaction temperature, it is necessary to periodically remove the low boiling condensation products, i.e. water, phenol etc., by distillation to avoid inhibiting further reaction.

Upon completion of the formation of the oligomer as described above, the reaction mass is polymerized to a high viscosity, such as within the range of an inherent viscosity of 1.0 to 5.0. The reaction proceeds with increasing speed with increases in temperature over about 345°C. A very marked increase in polymerization speed is found to lie in the region between 400°C up to the decomposition temperature, i.e. in the vicinity of about 470°C, depending upon the particular polymer. Therefore, it is particularly desirable for the fastest polymerization rates to utilize a temperature in the range of 420°–470°C.

In order to facilitate the polymerization, the oligomer may be ground to a particle size small enough to permit substantially all of the particles to pass through a 20 mesh screen of the Tyler series. However, an intermediate grinding step need not be imposed primarily when the oligomer is formed in the presence of a diluent or in a stirred reactor which thereby produces finely divided or particulated solid material.

The resulting polymer is particularly useful in the preparation of fibers, films and fibrils by wet or dry spinning and the like extruding techniques. In the spinning or shaping of the polymer into a fiber, film or the like structure, it is preferable to have an inherent viscosity of at least above about 0.7 and more preferably above 1.0, as higher inherent viscosities contribute to higher fiber strength.

Polymers of the present invention can be shaped from solutions of sulfuric acid, preferably of a concentration of 95–100%, oleum, i.e. sulfuric acid containing up to 20% or higher free $SO_3$, hydrofluoric acid, phosphoric acid and other suitable strong inorganic acids, and organic solvents such as tetramethylurea, N,N-dimethylacetamide, N,N-dimethylisobutylamide, 1,3-dimethylimidazolidinone-2, N-methylpyrrolidone-2, hexamethylphosphoramide and the like.

For purposes of simplicity, the invention will be described hereinafter more particularly with respect to the most preferred reactants, i.e. diphenylterephthalate and paraphenylenediamine. However, this is not to be interpreted as limiting the invention, as it will be recognized that variations therein as set forth herein can be used with correspondingly good results.

The invention will be more fully described by reference to the examples which illustrate certain preferred embodiments.

EXAMPLE 1

Polyparaphenyleneterephthalamide was produced in accordance with the present invention by charging to a reactor 300 parts of diphenylether, 54.07 parts of paraphenylenediamine and 159.16 parts of diphenylterephthalate. The reaction vessel was then flushed with argon and evacuated three times to remove oxygen. The reactor was then sealed and heated at 325°C for 1 hour. A pressure of 100 pounds per square inch gauge was maintained and phenol by-product was bled off. At the end of the one hour heating period, the sealed reactor temperature was increased to 375°C and held at that temperature for 2 hours. At the completion of this heating, the diphenylether was flashed off and a pale yellow finely powdered polymer was recovered. The polymer inherent viscosity was 0.41 dl/gram as measured in concentrated sulfuric acid.

The powdered polymer is further polymerized in the solid state in the presence of 200 weight percent based on the polymer of diphenylether at a temperature of 400°C until an inherent viscosity of 2.5 is reached.

EXAMPLE 2

Polyparaphenyleneterephthalamide was produced in accordance with the present invention by reacting equal molar portions of paraphenylenediamine and diphenylterephthalate. The reaction was carried out by charging 5.41 parts of paraphenylenediamine, 15.92 parts of diphenylterephthalate, 100 parts of diphenylsulfone and 100 parts of para xylene to a reactor. The reactor was purged with nitrogen to remove oxygen. Heating was commenced under a nitrogen blanket. Reaction by-product began distilling from the reactor at a temperature of 152°C. The temperature was increased over a period of about 45 minutes to 376°C. This temperature was maintained for approximately 3.3 hours. The product was then cooled and the reaction mixture stirred in refluxing acetone and filtered to separate the polymer from the soluble materials and diphenylsulfone. The resulting polymer had an inherent viscosity of 1.36 as measured in concentrated sulfuric acid.

The resulting product of this example could be further polymerized under solid state conditions with or without the presence of a heat transfer diluent to obtain higher inherent viscosities.

In the same manner, the corresponding polyparaphenyleneisophthalamide, the polymetaphenyleneterephthalamide, polymetaphenyleneisophthalamide and mixtures thereof are condensed and polymerized to inherent viscosities above 0.4 and more preferably above 1.0. In such polymerizations, the phenol portion of the starting monomer is volatilized during the reaction and readily recovered. The recovered phenol is conveniently reused in the esterification of the aromatic acid as taught herein.

Additionally, in the same manner, other aromatic phenyl esters described herein are condensed and polymerized with the aromatic diamines as described herein to produce polymers useful for film and fiber formation.

While there have been described more particularly the preferred embodiments of the present invention, particularly with respect to the polymerization of polyparaphenyleneterephthalamide, it will be readily recognized by those skilled in the art that the various other wholly aromatic polyamides described herein are polymerized in the same manner with correspondingly good results. As such, it is intended to cover the invention broadly being limited only by the following claims.

What is claimed is:

1. A method for preparing high molecular weight aromatic polyamides comprising
   a. heating at a temperature between 100° and about 345°C. in the presence of an inert liquid diluent and in about a mole to mole ratio a monomeric diester compound corresponding to the formula

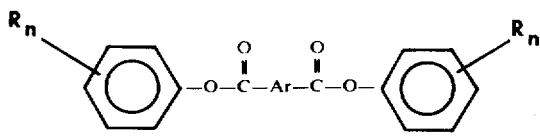

and a diamine of the formula

wherein Ar is selected from the group consisting of

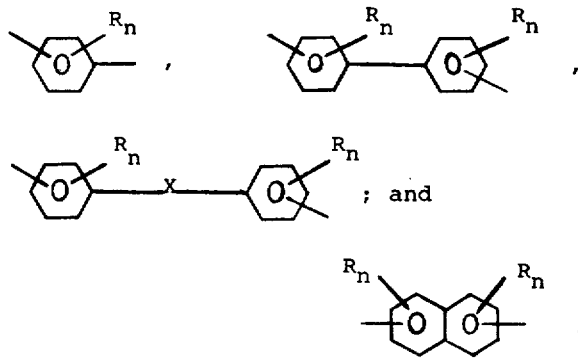

and mixtures thereof,
wherein R is a monofunctional substituent inert under the reaction conditions,
wherein X is oxygen,

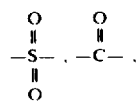

cycloalkylidene of up to 8 carbon atoms or $CY_2$ wherein C is carbon and Y is hydrogen, mononuclear aryl or alkyl of 1 to 6 carbon atoms, and wherein $n$ is an integer of 0 to 4,
said heating being in the substantial absence of oxygen to form an oligomer having an inherent viscosity of about 0.1 to about 0.4, as measured in a solution of 0.4 grams of oligomer per 100 milliliters of concentrated aqueous sulfuric acid, 97–99% by weight, at 25°C., and b. subsequently increasing said temperature to a range of from 400° to about 470°C. thereby volatilizing monomeric by-products and continuing said heating for a time sufficient to form an aromatic polyamide having an inherent viscosity of 1.0 to 5.0, as measured in a solution of 0.4 grams of said aromatic polyamide product per 100 milliliters of concentrated aqueous sulfuric acid, 97–99% by weight, at 25°C.

2. The method of claim 1 wherein R is hydrogen, phenyl, halogen, aliphatic or alkoxy of 1 to 6 carbon atoms.

3. The method of claim 2 wherein the inert liquid diluent of claim 1 step (a) is a solvent for the monomeric diester and the diamine, and is removed after formation of the oligomer.

4. The method of claim 2 wherein the inert liquid diluent of claim 1 step (a) is a solvent for the aromatic polyamide product and is present during the heat treatments of steps (a) and (b).

5. The method of claim 2 wherein the inert liquid diluent of claim 1 step (a) is a solvent for the monomeric diester, the diamine and the aromatic polyamide product, and is present during the heat treatments of steps (a) and (b).

6. The method of claim 5 wherein sufficient inert liquid diluent is present so as to serve as a heat transfer agent during the heat treatments of steps (a) and (b).

7. The method of claim 2 wherein the monomeric diester compound and diamine are reacted under superatmospheric pressure and said pressure is reduced to atmospheric or subatmospheric after formation of said oligomer.

8. The method of claim 7 wherein the diamine is paraphenylenediamine.

9. The method of claim 8 wherein the monomeric diester compound is diphenylterephthalate.

10. The method of claim 9 wherein the volatilized monomeric by-products are recovered.

11. The method of claim 10 wherein the volatilized monomeric by-products are recycled to form the monomeric diester starting material.

12. The method of claim 11 wherein an excess of up to about 2 mole percent of one reactant is used.

* * * * *